United States Patent
Holt et al.

(10) Patent No.: US 6,350,385 B1
(45) Date of Patent: Feb. 26, 2002

(54) METHOD AND APPARATUS FOR CONTROLLING WATER SYSTEM FOULING

(76) Inventors: William Holt, 4106 Clovernook La., Seabrook, TX (US) 77586; John V. Kraft, 32902 Mayer Rd., Waller, TX (US) 77484

( * ) Notice: Subject to any disclaimer, the term of this patent is extended or adjusted under 35 U.S.C. 154(b) by 0 days.

(21) Appl. No.: 09/748,103

(22) Filed: Dec. 22, 2000

(51) Int. Cl.[7] .................................................. C02F 1/46
(52) U.S. Cl. ...................... 210/748; 210/764; 210/95; 204/273; 204/280; 204/286; 204/287; 205/742
(58) Field of Search ................................. 210/748, 764, 210/95; 204/273, 280, 286, 287; 205/742

(56) References Cited

U.S. PATENT DOCUMENTS

| | | | |
|---|---|---|---|
| 4,525,253 A | * | 6/1985 | Hayes et al. |
| 4,936,979 A | | 6/1990 | Brown |
| 5,364,512 A | * | 11/1994 | Earl |
| 5,685,991 A | | 11/1997 | Johnson |
| 5,753,100 A | * | 5/1998 | Lumsden |

* cited by examiner

Primary Examiner—Betsey Morrison Hoey
(74) Attorney, Agent, or Firm—Joseph S. Heino

(57) ABSTRACT

A method and apparatus turbulently exposes water flowing through a water system to a plurality of electrodes of an ion generator and provides a self-contained tank through which water flows. The generally cylindrical containment tank includes a tangential inlet pipe and an elliptical base having an outlet pipe. An aspect ratio, inlet pipe diameter versus containment tank diameter, is defined to achieve optimum ionization. A tank cover serves as the non-electrical conducting head for a plurality of electrodes which extend downwardly from the underside of the cover. The electrodes are functionally configured to maximize water flow between them. The rate of water flow within the containment tank is defined such that residence time of flow within the tank likewise optimizes water ionization. A sight glass allows for visualization of the container contents, and in particular anode wastage or wear, during operation.

6 Claims, 3 Drawing Sheets

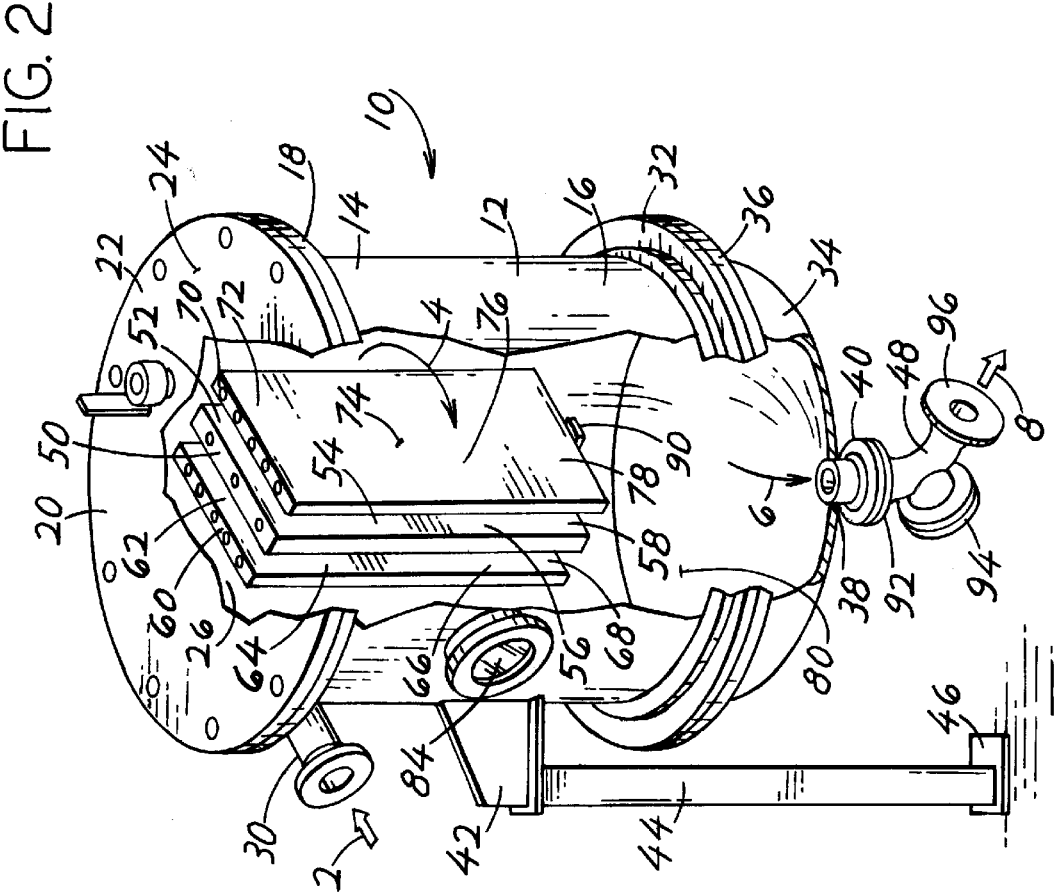
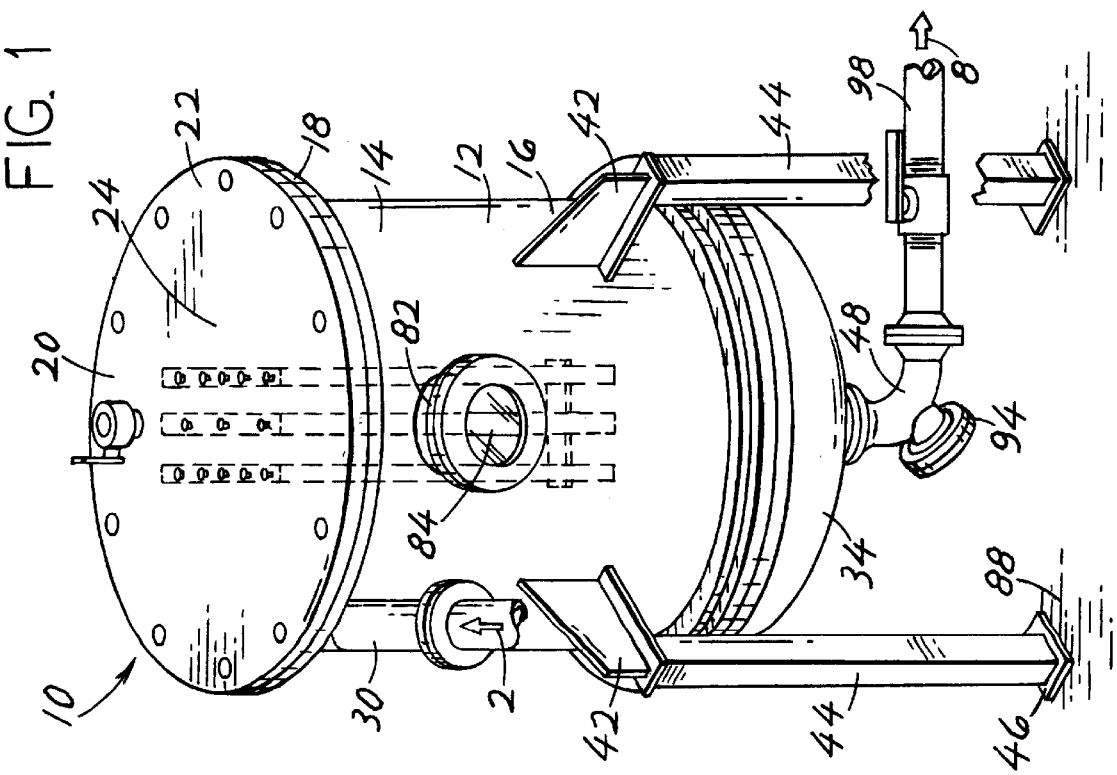

METHOD AND APPARATUS FOR CONTROLLING WATER SYSTEM FOULING

FIELD OF THE INVENTION

This invention relates generally to methods and devices used with water systems. More particularly, it relates to a method and apparatus for exposing water which flows through a water system to an ion generator whereby ions which are generated are fed into the water flow to prevent fouling of the water system by algae, nuisance invertebrates, microorganisms, and inorganic salts.

BACKGROUND OF THE INVENTION

It has long been known that algae, nuisance invertebrates, microorganisms, and inorganic salts may foul water systems and lead to very significant water system inefficiencies. These inefficiencies result in increased energy consumption and increased maintenance demands which, in turn, increase overall operational and maintenance costs by several orders of magnitude. Ion generators have been employed in previous attempts to control algae, nuisance invertebrates, and microorganisms. Such ion generators are based on well-known principles of electrochemical reactions, one of which is referred to as electrolysis. Electrolysis is an electrochemical process by which electrical energy is used to promote chemical reactions that occur on the surface of functionally cooperating electrodes. One electrode, called the anode, involves the oxidation process where chemical species lose electrons. A second electrode, called the cathode, involves the reduction process where electrons are gained. In water, for example, oxygen is generated at the anode and hydrogen is generated at the cathode. The generation of hydrogen and oxygen in fresh water by the process of electrolysis will be weak due to the low electrical conductivity of the water. The oxygen generated aids in the prevention of the deposit of inorganic salts on the electrodes. The function of an ion generator is also to produce metal ions, typically copper ions or silver ions. Metal ion production is accomplished by use of an electrically charged metal anode which comprises atoms of the metal ions which are to be generated. It is the purpose of the ion generator to feed the metal ions out of the generator before they can be deposited on a cathode. Such depositing completely defeats the purpose of the ion generator as it is intended to be used in the application described here. The metal ions and oxygen, both of which are produced by the ion generator in the present application, are feed into the water stream of the water system to prevent fouling of the system by algae, nuisance invertebrates, microorganisms, and inorganic salts.

Copper, in its dissolved form, is one anthropogenic heavy metal that, although essential to biological functions in trace amounts, can be toxic at higher concentrations. The toxicity of copper to aquatic organisms is well established although the exact mechanism is not well defined. Copper toxicity is related to the form and, in general, copper must be in an ionic form in order for it to be toxic to invertebrates, microorganisms and algae. The eradication of microorganisms with copper ions is attributed to positively charged ions which are both surface active and microbiocidal. These ions attach themselves to the negatively charged bacterial cell wall of the microorganism and destroy cell wall permeability. This action, coupled with protein denaturation, induces cell lysis and eventual death. The in-water residence time for the biologically toxic portion of ionized copper may well be on the order of hours. One advantage to the use of copper ionization is that eradication efficacy is wholly unaffected by water temperature. Chlorine, a commonly used antifouling chemical, is somewhat temperature dependent. Furthermore, the copper ions actually kill the microorganisms, and other microorganism promoting bacteria and protozoa, rather than merely suppress them, as in the case of chlorine. This minimizes the possibility of later recolonization. Other advantages of copper ionization compared to other eradication techniques include relatively low cost, straight forward installation, easy maintenance, and the presence of residual disinfectant throughout the system.

A copper ion generator is, by way of specific example, an effective method for controlling legionella which is likely to be present in most water systems. Legionella is predominantly present in water cooling systems in microbial biofilms which become attached to surfaces submerged in the aquatic environment. These biofilms are typically found on the surfaces of pipes and stagnant areas of the water cooling system. Many components of most any man-made water system can be considered to be an amplifier for the organism (i.e., the organism can find a niche where it can grow to higher levels, or be amplified) or a disseminator of the organism. Examples of man-made amplifiers include cooling towers and evaporative condensers, humidifiers, potable water heaters and holding tanks, and conduits containing stagnant water. Showerheads, faucet aerators, and whirlpool baths may serve as amplifiers as well as disseminators. Human infection from exposure to legionella, or legionosis, can result in a pneumonia illness that is commonly referred to as Legionnaire's disease, namesake of the famous 1976 outbreak in Philadelphia. Since the Philadelphia outbreak, about 1,400 cases are officially reported to the Center for Disease Control annually.

Other bacteria and protozoa can also colonize water cooling system surfaces and some have been shown to promote legionella replication. Amoebae and other ciliated protozoa are natural hosts for legionella. Legionella multiply intracellularly within amoebae trophozoites. *Logionella pneumophila* is known to infect five different genera of amoebae, most notably *Hartmanella vermiformis* and Acanthamoeba. Legionella can also multiply within the ciliated protozoa, Tetrahymena. Bacterial species that appear to provide legionella with growth promoting factors include Pseudomonas, Acinetobactor, Flavobacterium, and Alcaligenes. Copper ions are an effective method of control for each of these bacteria and protozoa.

The controlled release of copper ions has also been known to serve as an effective attachment and growth control for such marine organisms as algae, mussels, oysters and barnacles. Copper ions can eliminate and control algae, for example, by inhibiting photosynthesis which leads to its demise. And copper ions have been shown to be more lethal to the zebra mussel than other metal ions. For effective zebra mussel control in freshwater, for example, copper ion concentrations of eight parts per billion are estimated to be required, which is a level well below that recommended by the Environmental Protection Agency for freshwater aquatic protection.

The design of ion generators for salt water can generally be considered trivial. Due the high electrical conductivity of salt water, factors such as electrode spacing are not important. In fact, electrodes used in salt water application can be spaced many tens of centimeters apart without any consequential effect on system operation. Problems such as "bridging" of inorganic salts between the anode and the cathode, which leads to electrical shorting and conductivity stratification, are not a factor. The design and operation of copper ion generators in fresh water systems is consequentially different than the design employed in salt water systems. Simply put, the design and operational differences of salt water and fresh water copper ion generation systems are fundamentally related to the large differences, of several orders of magnitude, in electrical conductivity. Because of those differences, the present art employed in the design and operation of commercial copper ion generators for fresh water cooling systems has significant operational problems. In the experience of these inventors, users of present copper ion generators in industrial cooling water systems have reported problems such as bridging which leads to electrical shorting, electrical conductivity stratification which results in uneven electrode erosion, and plating of copper on the cathode.

Bridging, as previously described, occurs because of the necessity of placing the anode and cathode in close proximity to one another in fresh water systems. One way of dealing with this problem is to periodically reverse polarity of the electrodes. This solution, however, introduces system inefficiencies due to the fact that polarity reversal renders the system non-functional for the period of time that polarity is reversed. Uneven electrode erosion due to electrical conductivity stratification occurs for the reason that nonuniform water flow occurs between electrodes. In present designs, the velocity of the water which flows between the electrodes is not generally constant over the electrode face. This leads to stratification of inorganic materials in the water which, in turn, produces electrical conductivity stratification. Finally, plating of the metal anode material on the cathode, as previously mentioned, completely defeats the purpose of the ion generator in the present application. When plating occurs, the metal ions are deposited on the cathode rather than being introduced into flow stream that is to be treated. In the experience of these inventors, each of these problems is related to water flow and to electrode spacing, which is required to be very close in fresh water systems when compared to systems designed for use in salt water. The spacing of the electrodes in close proximity to each other in fresh water systems is required if power system expectations are to be within reason, on the order of a few hundred watts. The system simply will not be economical if maximum power requirements exceed several kilowatts.

SUMMARY OF THE INVENTION

It is, therefore, a principal object of this invention to provide a new, useful, and uncomplicated method and apparatus for exposing the water flow within a water system to an ion generation device wherein water velocity is increased between the electrodes of the ion generator. It is another object of this invention to provide such a method and apparatus where a tangential inlet is provided to create a high velocity vortex flow within the system in the vicinity of the ion generator electrodes. It is yet another object to provide such a method and apparatus which avoids "dead zones," or areas where water velocities in the vicinity of the ion generator electrodes are low. It is still another object of the present invention to provide such a method and apparatus in which the aspect ratio (i.e., the ratio between the system inlet and the system containment tank diameter) is defined to lock on to a water flow velocity range which must be maintained for proper system operation and in which the residence time of flow within the system is similarly defined and maintained. It is still another object to provide such a method and apparatus in which a non-electrical conducting head is used to mount the electrodes of the ion generator and where a plurality of cooperatively alternating anodes and cathodes may be used. It is yet another object of the present invention to provide such a method and apparatus in which an automatic discharge valve is provided to control the system water level within the ion generator thereby maintaining a minimum vertical velocity, within the system. It is still another object to provide a self-cleaning elliptical or conical base to the flow tank. It is yet another object to provide such a method and apparatus wherein a sight glass is utilized to allow for visual inspection of anode wastage. It is still another object to provide such a method and apparatus wherein performance is optimized while manufacturing costs are not increased significantly.

The present invention has obtained these objects. It overcomes the aforementioned problems and disadvantages by providing a method and apparatus in which water flowing through a water system is vigorously and turbulently exposed to a plurality of electrodes of an ion generator whereby ions which are generated are fed into the water flow to prevent fouling of the water system by algae, nuisance invertebrates, microorganisms, and inorganic salts. The present invention accomplishes this by providing an ion generator having a self-contained tank through which the water flows. The generally cylindrical containment tank includes a tangential inlet pipe at the uppermost portion of the tank. An elliptical tank base includes an outlet pipe in combination with a tank clean out device at the lowermost portion of the tank. An aspect ratio, inlet pipe diameter versus containment tank diameter, is defined to achieve optimum ionization. A tank cover is provided which serves as the non-electrical conducting head for a plurality of electrodes which extend downwardly from the underside of the cover. When the tank cover is in place in its normal operating position, the electrodes are suspended from the tank cover within the containment tank. The electrodes are functionally configured, both in size and placement, to maximize water flow between them. The rate of water flow within the containment tank is defined such that residence time of flow within the tank likewise optimizes water ionization. A sight glass is provided within the containment tank to allow for visualization and monitoring of the container contents, and in particular anode wastage or wear, during operation. The foregoing and other features of the method and apparatus of the present invention will be apparent from the detailed description which follows.

BRIEF DESCRIPTION OF THE DRAWINGS

FIG. 1 is a front and top perspective view of a water system fouling control apparatus constructed in accordance with the present invention.

FIG. 2 is a partially sectioned front, top and right side perspective view of the water system fouling control apparatus shown in FIG. 1.

DETAILED DESCRIPTION

Figure 3:
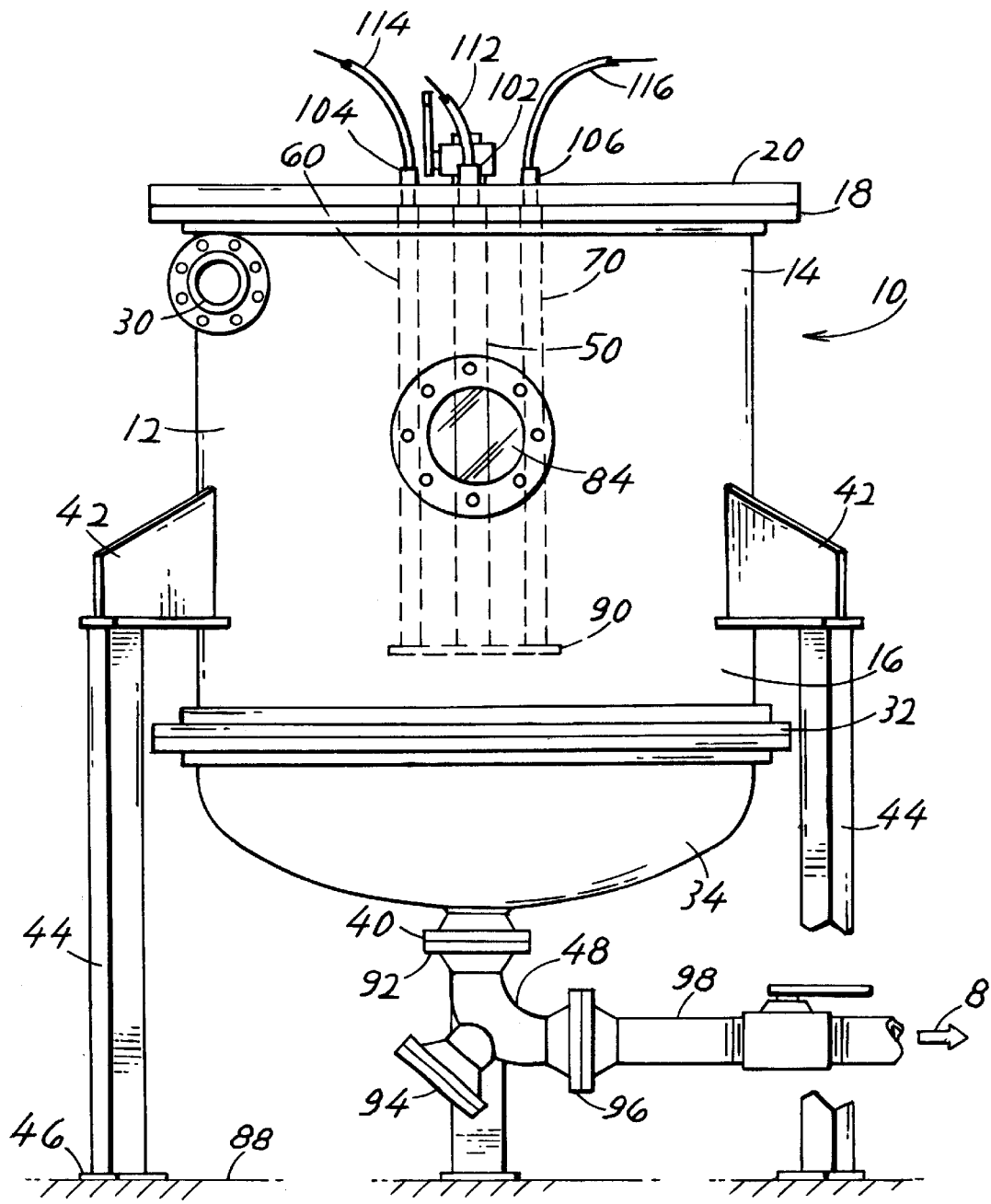
FIG. 3 is an enlarged front elevational view of the water system fouling control apparatus shown in FIG. 1.

Referring now to the drawings in detail, wherein like numerals represent like elements throughout, FIG. 1 illustrates a preferred embodiment of a device which utilizes the method and apparatus of the present invention. An ion generator assembly, generally identified 10, includes a containment tank 12 which is generally cylindrical in physical configuration. The containment tank 12 includes an upper tank portion 14 and a lower tank portion 16. Situated about the perimeter of the upper tank portion 14 is an upper tank flange 18. Situated about the perimeter of the lower tank portion 16 is a lower tank flange 32. In the preferred embodiment of the device of the present invention, the tank 12 is constructed of standard pipe having a 48 inch inner diameter. This dimension, though not significant in and of itself, is significant in view of other assembly dimensions which will become apparent later in this detailed description.

Figure 4:
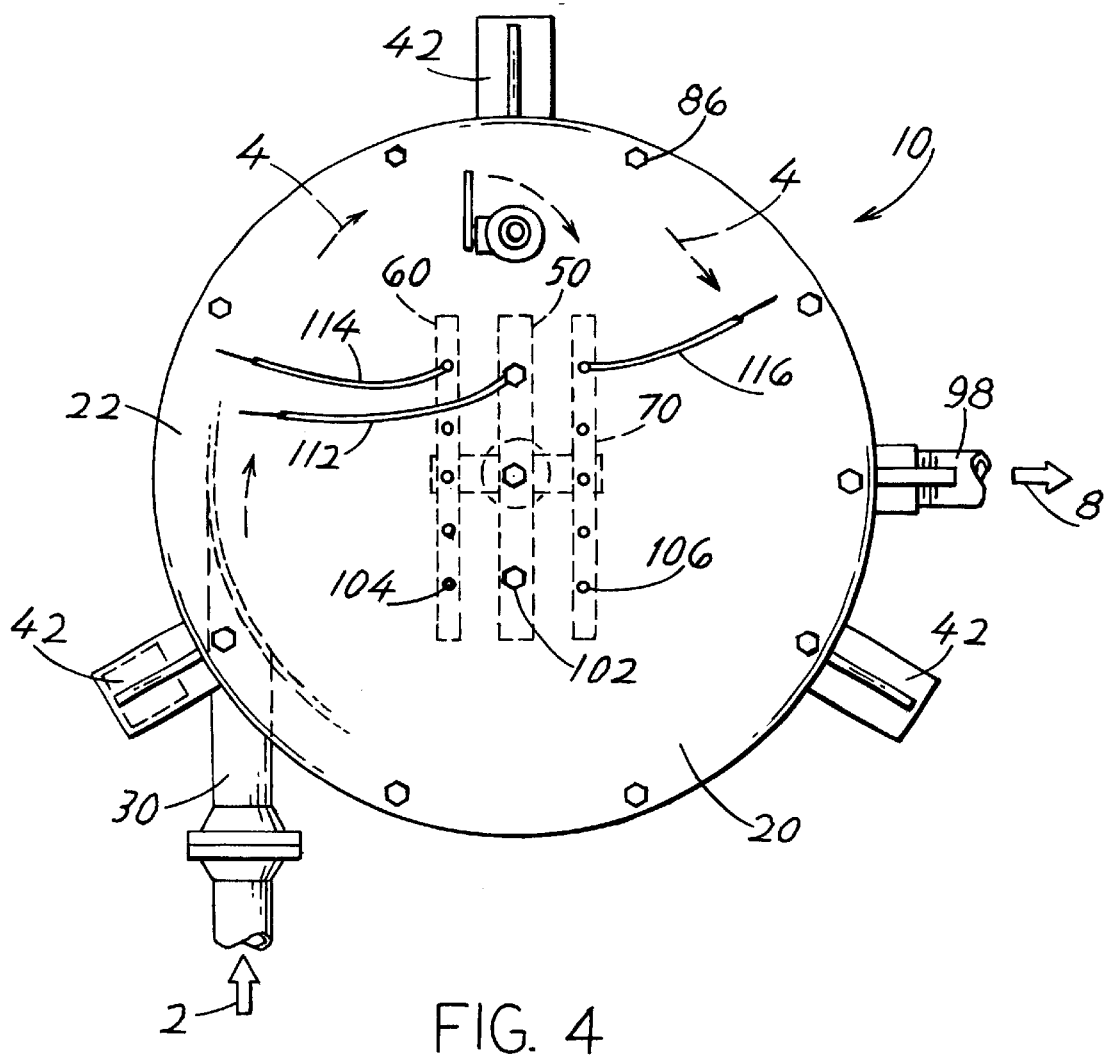
FIG. 4 is a top plan view of the water system fouling control apparatus shown in FIG. 3.

The containment tank 12 is supported about its outer perimeter by a plurality of support legs 44, each support leg 44 being attached to the tank 12 by means of a support gusset 42. Each leg 44 also includes a support foot 46 which rests upon a generally horizontal surface 88. As shown in FIG. 4, three such legs 44 are illustrated. It is to be understood that more legs 44 could be utilized if such was desired or required, the number of such legs 44 not being a functional limitation of the present invention.

Attachable to the upper tank flange 18 is a tank cover or lid 20. The lid 20 includes a lid perimeter 22, a top lid surface 24 and a lid underside surface 26. In the preferred embodiment, the lid 20 is constructed of a theroset plastic material which provides strength, durability and electrical nonconductivity. The significance of this electrical nonconductive, or electrical insulating, feature will become apparent later in this detailed description. The lid 20 is attachable to the upper tank portion 14 by means of a plurality of fasteners 86, such as bolts, which are installed about the lid perimeter 22 and through the upper tank flange 18. See FIG. 4. Here again, the number of such fasteners 86 is not a functional limitation of the present invention. The number of fasteners 86 may be varied without deviating from the scope of this invention. The important feature of the fasteners 86 is that they prevent the lid 20 from coming away from the tank 12 and that they prevent rotation of the lid 20 about the tank 12.

Attachable to the bottom tank flange 32 is an elliptical head 34 having a head flange 36. In the preferred embodiment, the material and the diameter of the head 34 matches that of the tank 12. The lowermost portion of the head 34 includes a centrally located bottom aperture 38. Attached to the aperture 38 is a bottom flange 40. Attached to the bottom flange 40 is an elbow 48 which includes a first flange 92, a clean-out 94, and a second flange 96. Attached to the second flange 96 is a discharge pipe 98 through which tank discharge flow 8 is accomplished.

The upper tank portion 14 also includes an inlet pipe 30 which provides a continuum with the interior 80 of the containment tank 12. As shown, the flow path 2 through the inlet pipe 30 is generally tangential to the tank interior 80. In the preferred embodiment, the inner diameter of the inlet pipe 30 is 4 inches. In this fashion, the tank 12 diameter to inlet pipe 30 diameter ratio is 12:1. The tank 12, the elliptical head 34 and the inlet pipe 30 are fictionally cooperative to allow water flow 2 through the inlet 30, into the tank interior 80 in a whirlpool-like or vortex flow 4, and out the bottom aperture 38 of the head 34 in a discharge flow 6. See FIGS. 2 and 3. The significance of this flow pattern will become apparent later in this detailed description. The containment tank 12 also includes a sight glass aperture (not shown) defined within the wall of the tank 12. Attached to the aperture is a sight glass flange 82 and a sight glass 84. The purpose of the sight glass 84 is to provide visual access to the tank interior 80. As shown, the axis of the pipe 30 is parallel to the axis of the sight glass 84. This general alignment is desirable in the preferred embodiment, but not absolutely critical.

Attached to the underside 26 of the lid 20 are a number of functionally cooperating electrodes 50, 60, 70. As shown in the preferred embodiment, an anode 50, a first cathode 60 and a second cathode 70 are provided. The anode 50 is effectively "sandwiched" between the cathodes 60, 70. Although only a single anode 50 and a pair of cathodes 60, 70 are shown, it is to be understood that the number of such electrodes 50, 60, 70, and the combination of them, is not a functional limitation of the present invention. Other combinations could be provided, such as two anodes and three cathodes or three anodes and four cathodes, and so on, without deviating from the scope of the present invention. As shown, the anode 50 and each cathode 60, 70 are each fabricated in the shape of a rectangular prism. In the preferred embodiment, the anode 50 is made of copper or silver and each cathode 60, 70 is made of stainless steel. Again, the material from which each of the electrodes 50, 60, 70 is made is not a limitation of the present invention, other than that the materials used must be functionally conducive to the process of electrolysis. The anode 50 includes a top anode portion 52, a central anode portion 54, a bottom anode portion 58, and a pair of anode faces 56, the anode faces 56 being generally parallel to one another and providing the greatest surface area of the anode 50. Similarly, each cathode 60, 70 includes a top cathode portion 62, 72, a central anode portion 64, 74, a bottom anode portion 68, 78, and a pair of anode faces, 66, 76, respectively. The anode 50 is attached centrally to the lid underside 26 by means of a plurality of anode fasteners 102. See FIG. 4. Similarly, each cathode 60, 70 is attached to the lid underside 26 by means of a plurality of cathode fasteners 104, 106, respectively. At the bottom portion 58 of the anode 50 and the bottom portions 68, 78 of each of the cathodes 60, 70, respectively, is a stabilizing element 90. The stabilizing element 90 is functionally adapted to maintain the electrodes 50, 60, 70 in substantially parallel planar relationship. In this parallel planar relation, the plane defined by each electrode 50, 60, 70 is substantially parallel to the axis of the inlet pipe 30. See FIGS. 2 and 4. As shown, one of the anode fasteners 102 is attached to a positive electrical lead 112 through which an electrical current may flow. Similarly, one of the cathode fasteners 104, 106 attached to each of the cathodes 60, 70, respectively, is attached to a negative, or grounding, lead 114, 116. An electrical potential or voltage may be applied across the anode lead 112 and each of the cathode leads 114, 116, and therefor across the anode 50 and each of the cathodes 60, 70. In the preferred embodiment, a power supply on the order of several hundred watts may be applied to achieve the electrochemical process of electrolysis across the electrodes 50, 60, 70.

In application, water flow 2 is initiated to the interior 80 of the tank 12 by means of the tangential inlet pipe 30. In this fashion, water enters the tank interior 80 and follows the annular wall surface in a whirlpool-like or turbulent vortex-type fashion, These inventors have found that water inlet velocity should not be less than 5 feet per second. This water flow 4 allows water to pass around, over and between the generally parallel electrodes 50, 60, 70. This turbulence facilitates the electrolysis process and the migration of metal ions away from the anode 50 and away from the cathodes 60, 70 before the metal ions have a chance to attach themselves to the cathodes 60, 70 thus defeating the purpose of ionic water treatment. These inventory have also found that "residence time," or vertical flow between the anode 50 and either cathode 60, 70 should be not less than 0.5 seconds and not more than 2.0 seconds. The minimum vertical velocity between the anode 50 and either cathode 60, 70 is 2 feet per second. These inventors have also found that additional hydrodynamically designed vanes or other flow directing devices (not shown) could be added at the point where the inlet pipe 30 intersects the tank 12 to accentuate or enhance vortex flow 4 within the tank interior 80. Similar devices may be installed at the discharge aperture 38 of the head 34 for the same purpose. The flow 4 continues about the electrodes 50, 60, 70 until the water flow 6 discharges through the head aperture 38, the water being properly ionized at this point. The elliptical head 34 and the aperture 38 defined in it serves a "self-cleaning" function by discharging suspended solids contained within the flow stream 6. The water ionization at this point of discharge serves to control algae, nuisance invertebrates, microorganisms and inorganic salts lurking in other parts of the water system within which the ion generator assembly 10 of the present invention is incorporated. As the electrolysis process continues, the anode 50 effectively becomes used up as ions are given up to the water flow 4. The sight glass 84 allows the user to view the containment tank interior 80 to determine if anode wastage has occurred to the point that the anode 50 must be replaced. Replacement of the anode 50 is easily accomplished by removal of the tank lid 20, detachment of the anode lead 112, withdrawal of the anode fasteners 102, insertion of a new anode 50, replacement of the anode fasteners 102, reattachment of the anode lead 1 12 and reseating of the lid 20.

From the foregoing description of the illustrative embodiment of the invention set forth herein, it will be apparent that there has been provided a new, useful, and uncomplicated method and apparatus for exposing the water flow within a water system to an ion generation device wherein water velocity is increased between the electrodes of the ion generator; where a tangential inlet is provided to create a high velocity vortex flow within the system in the vicinity of the ion generator electrodes and which avoids "dead zones," or areas where water velocities in the vicinity of the ion generator electrodes are low; where the aspect ratio (i.e., the ratio between the system inlet and the system containment tank diameter) is defined to lock on to a water flow velocity range which must be maintained for proper system operation and the residence time of flow within the system is similarly defined and maintained; where a non-electrical conducting head is used to mount the electrodes of the ion generator and where a plurality of cooperatively alternating anodes and cathodes may be used; where an automatic discharge valve is provided to control the system water level within the ion generator thereby maintaining a minimum vertical velocity within the system; where a self-cleaning elliptical or conical base to the flow tank is provided; and where a sight glass is utilized to allow for visual inspection of anode wastage.

The principles of this invention having been fully explained in connection with the foregoing, I hereby claim as my invention:

1. An apparatus for generating ions within a water system whereby fouling of the system by algae, nuisance invertebrates, microorganisms and inorganic salts is prevented, which comprises a water containment tank, said tank including a generally cylindrical tank interior, said tank interior including an upper tank portion and a lower tank portion, and said tank further including a tank aperture situated at said tank upper portion whereby said tank interior is made accessible through said aperture and a side wall, means for inletting water to said tank, said water inletting means including an inlet pipe which is disposed tangentialy to the upper portion of said tank interior whereby water is introduced to the tank interior in a turbulent vortex manner, means for outletting water from said tank, a cover member which is functionally adapted to sealingly enclose said tank aperture, said cover member being made of an electrically nonconductive material, an ion generating means disposed within said tank interior, said ion generating means including at least one anode and at least one cathode and means for attaching the at least one anode and the at least one cathode to said tank cover member in proximal spatial relation whereby ions are generated therebetween, and a sight glass defined within said tank side wall whereby the at least one anode may be visualized.

2. The antifouling apparatus of claim 1 wherein said at least one anode and said at least one cathode are oriented in relation to said inlet pipe water flow whereby water flow between the said at least one anode and the said at least one cathode is maximized.

3. The antifouling apparatus of claim 1 wherein said at least one anode and said at least one cathode are each configured as a plate-like rectangular prism, said at least one anode and said at least one cathode are placed in generally parallel planes relative to each other, and said at least one anode and said at least one cathode are oriented in relation to said inlet pipe water flow whereby water flow between said at least one anode and said at least one cathode is maximized.

4. A method for generating ions within a water system whereby fouling of the system by algae, nuisance invertebrates, microorganisms and inorganic salts is prevented, which comprises the steps of providing a water containment tank, said tank including a generally cylindrical tank interior, providing an upper tank portion and a lower tank portion, providing a tank aperture situated at said tank upper portion whereby said tank interior is made accessible through said aperture, providing a cover member which is functionally adapted to sealingly enclose said tank aperture and which is made of an electrically nonconductive material, providing a containment tank side wall, inletting water to said tank interior, said water inletting step comprising providing an inlet pipe which is disposed tangentially to the upper portion of said tank interior whereby water is introduced to the tank interior in a turbulent vortex manner, flowing water through said tank interior, outletting water from said tank interior, and generating ions within said tank interior, said ion generating step comprising providing at least one anode and at least one cathode and attaching the at least on anode and the at least one cathode to said tank cover member in proximal spatial relation whereby ions are generated therebetween and ions are introduced into the water flow within said tank interior, and providing a sight glass defined within said tank side wall whereby the at least one anode may be visualized.

5. The antifouling method of claim 4 including, after said anode and cathode providing step, the step of orienting the said at least one anode and said at least one cathode in relation to said inlet pipe water flow whereby water flow between the said at least one anode and the said at least one cathode is maximized.

6. The antifouling method of claim 4 including, after said anode and cathode providing step, the steps of configuring the said at least one anode and said at least one cathode as a plate-like rectangular prism, placing the said at least one anode and the said at least one cathode in generally parallel planes relative to each other, and orienting the said at least one anode and said at least one cathode in relation to said inlet pipe water flow whereby water flow between said at least one anode and said at least one cathode is maximized.

* * * * *